United States Patent
Nazarian, Jr. et al.

(10) Patent No.: US 8,500,149 B1
(45) Date of Patent: Aug. 6, 2013

(54) CONTROL ARM ASSEMBLY

(75) Inventors: James H Nazarian, Jr., Marysville, OH (US); Philip S. H. Moir, Dublin, OH (US); Peter G. Langseth, III, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/567,129

(22) Filed: Aug. 6, 2012

(51) Int. Cl.
*B60G 3/02* (2006.01)
*B60G 7/00* (2006.01)

(52) U.S. Cl.
USPC ............... 280/124.134; 280/93.511; 277/635

(58) Field of Classification Search
USPC ....... 280/124.134, 124.135, 124.13, 124.133, 280/124.136, 124.144, 93.51, 93.511, 93.512; 403/134, 51; 277/634, 635
See application file for complete search history.

(56) References Cited

U.S. PATENT DOCUMENTS

| | | | |
|---|---|---|---|
| 4,237,986 A | 12/1980 | Frisbee | |
| 5,362,093 A * | 11/1994 | Klosterhuber et al. | 280/124.136 |
| 6,409,216 B2 | 6/2002 | Suzuki | |
| 6,687,949 B2 | 2/2004 | Zimmer | |
| 6,695,521 B2 | 2/2004 | Kincaid | |
| 6,810,586 B1 | 11/2004 | Waaler | |
| 7,575,244 B2 * | 8/2009 | Howell et al. | 280/124.134 |
| 7,625,000 B2 | 12/2009 | Campbell | |
| 7,648,304 B2 | 1/2010 | Wolf | |
| 7,934,735 B2 | 5/2011 | Kuwabara | |
| 7,980,576 B2 * | 7/2011 | Inoue et al. | 280/124.121 |
| 8,025,301 B2 * | 9/2011 | Guttilla et al. | 280/124.134 |
| 8,256,980 B2 * | 9/2012 | Walter et al. | 403/135 |
| 2009/0129854 A1 * | 5/2009 | Walter et al. | 403/42 |
| 2012/0098228 A1 * | 4/2012 | Wilson et al. | 280/124.134 |

* cited by examiner

*Primary Examiner* — Drew Brown
(74) *Attorney, Agent, or Firm* — Ulmer & Berne LLP

(57) ABSTRACT

A control arm assembly includes a control arm including a knuckle support member having an upper surface, a lower surface, a proximal end portion and a distal end portion. The upper surface includes a recessed portion extending from the distal end portion toward the proximal end portion. The distal end portion includes a collar defining an aperture for receiving a housing of a ball joint. The control arm assembly also includes a protective cap attached to the knuckle support member. The protective cap overlies the recessed portion of the upper surface of the knuckle support member.

20 Claims, 6 Drawing Sheets

CONTROL ARM ASSEMBLY

TECHNICAL FIELD

This application relates generally to suspension systems for vehicles, and more particularly, to control arm assemblies of suspension systems.

BACKGROUND

Some known vehicles include suspension systems that include a wheel knuckle, a control arm and a ball joint assembly that couples the control arm with the wheel knuckle. The ball joint assembly includes a ball joint and a boot attached to the ball joint, with the boot containing grease.

SUMMARY

According to one embodiment, a control arm assembly includes a control arm that includes a knuckle support member. The knuckle support member includes an upper surface, a lower surface, a proximal end portion and a distal end portion. The upper surface includes a recessed portion extending from the distal end portion toward the proximal end portion. The distal end portion includes a collar defining an aperture. The control arm assembly also includes a ball joint assembly that includes a ball joint and a boot. The ball joint includes a housing received within the aperture defined by the collar of the distal end portion of the knuckle support member. The boot is attached to the ball joint and is disposed in surrounding relationship with the housing of the ball joint. The control arm assembly also includes a protective cap attached to the knuckle support member. The protective cap includes an annular rim that defines an opening. The protective cap overlies the recessed portion of the upper surface of the knuckle support member. The boot extends through the opening defined by the annular rim of the protective cap, and the annular rim is disposed in sealing engagement with the boot.

According to another embodiment, a control arm assembly includes a control arm that includes a knuckle support member. The knuckle support member includes an upper surface, a lower surface, a proximal end portion and a distal end portion. The upper surface includes a recessed portion that extends from the distal end portion toward the proximal end portion. The distal end portion includes a collar defining an aperture. The control assembly also includes a protective cap attached to the knuckle support member. The protective cap is formed from a plastic material as a unitary structure and includes an annular rim defining an opening. The protective cap overlies the recessed portion of the upper surface of the knuckle support member. The opening defined by the annular rim of the protective cap is aligned with the aperture defined by the collar of the distal end portion of the knuckle support member.

According to one embodiment, a vehicle includes a front wheel, a knuckle coupled with the front wheel, a frame, and a control arm assembly pivotally coupled with the knuckle and with the frame. The control arm assembly includes a control arm and a ball joint assembly pivotally coupling the control arm with the knuckle. The control arm includes a knuckle support member and the control arm assembly further includes a protective cap attached to the knuckle support member. The knuckle support member includes an upper surface, a lower surface, a proximal end portion and a distal end portion. The upper surface includes a recessed portion extending from the distal end portion toward the proximal end portion. The distal end portion includes a collar defining an aperture. The ball joint assembly includes a ball joint and a boot. The ball joint includes a stem attached to the knuckle, and a housing received within the aperture defined by the collar of the distal end portion of the knuckle support member. The protective cap overlies the recessed portion of the upper surface of the knuckle support member and includes an annular rim that defines an opening aligned with the aperture defined by the collar of the distal end portion of the knuckle support member. The boot extends through the opening defined by the annular rim of the protective cap, and the annular rim is disposed in sealing engagement with the boot.

BRIEF DESCRIPTION OF THE DRAWINGS

Various embodiments will become better understood with regard to the following description, appended claims and accompanying drawings wherein:

DETAILED DESCRIPTION

Figure 1:
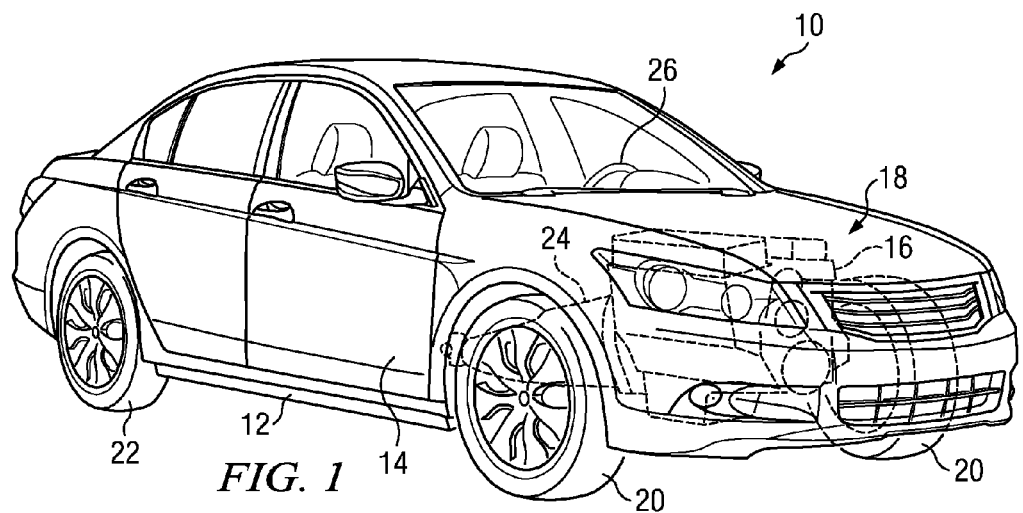
FIG. 1 is a right front perspective view depicting a vehicle that includes a suspension system according to one embodiment (not shown in FIG. 1)

Referring to the drawings, wherein like numbers indicate the same or corresponding elements throughout the views, a vehicle 10 according to one embodiment can be an automobile, as shown in FIG. 1, or any of a variety of other suitable vehicles, such as a recreational vehicle or a utility vehicle, for example. Vehicle 10 can include a frame 12, a body 14 supported by the frame 12, and an engine 16. The engine 16 can be positioned within an engine compartment, indicated generally at 18 in FIG. 1. Vehicle 10 can include a pair of front wheels 20 and a pair of rear wheels 22 (one shown) that can be rotatably coupled with the frame 12. The vehicle 10 can include a transmission 24 that can couple the engine 16 with one or more of the wheels, for example, one or more of the front wheels 20 and/or one or more of the rear wheels 22. The transmission 24 can be coupled to the engine 16 such that power can be transmitted from the engine 16 through the transmission 24, to a drivetrain (not shown), and to the wheels, for example, one or more of the front wheels 20 and/or one or more of the rear wheels 22 to propel the vehicle 10. The vehicle can include a steering wheel 26, which can be coupled to the front wheels 20 to facilitate steering the vehicle 10.

Figure 2:
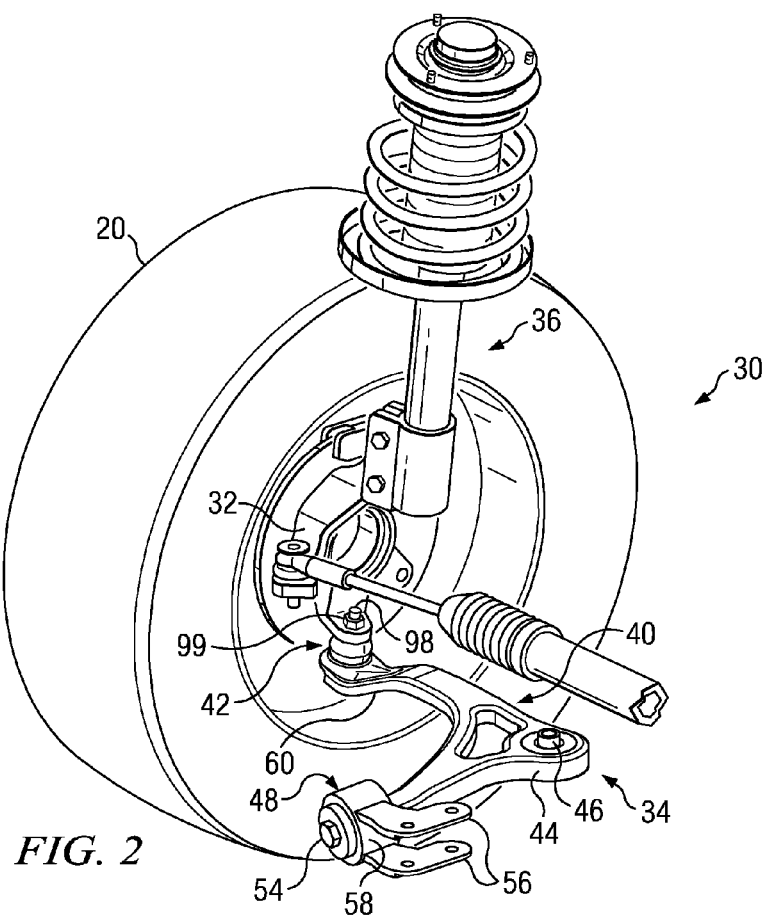
FIG. 2 is a perspective view depicting a right front wheel and a portion of the associated suspension system of the vehicle of FIG. 1, wherein certain components have been omitted for clarity of illustration.

As illustrated in FIG. 2, the vehicle 10 can include a suspension system 30 that can include a wheel knuckle 32, a control arm assembly 34 according to one embodiment, and a suspension damper 36 that can cooperate to rotatably support one of the front wheels 20 with respect to the frame 12. The control arm assembly 34 can include a control arm 40 and a ball joint assembly 42 that can couple the control arm 40 with the wheel knuckle 32. The control arm 40 can include a central hub portion 44, which can receive a frame ball joint 46. The control arm assembly 34 can include a bushing 48, which can be attached to the control arm 40, for example with a male fastener such as bolt 54. One or more brackets, for example a pair of brackets 56, can be attached at one end to a housing 58 of bushing 48, as shown in FIG. 2, and can be attached at an opposite end to the frame 12, for example with a plurality of fasteners (not shown). The frame ball joint 46 and bushing 48 can facilitate pivotal coupling of the control arm 40 with the frame 12. It will be appreciated, however, that a control arm assembly can be configured in any of a variety of suitable alternative arrangements that facilitate pivotal coupling of a control arm of the control arm assembly with a frame of a vehicle.

Figure 3:
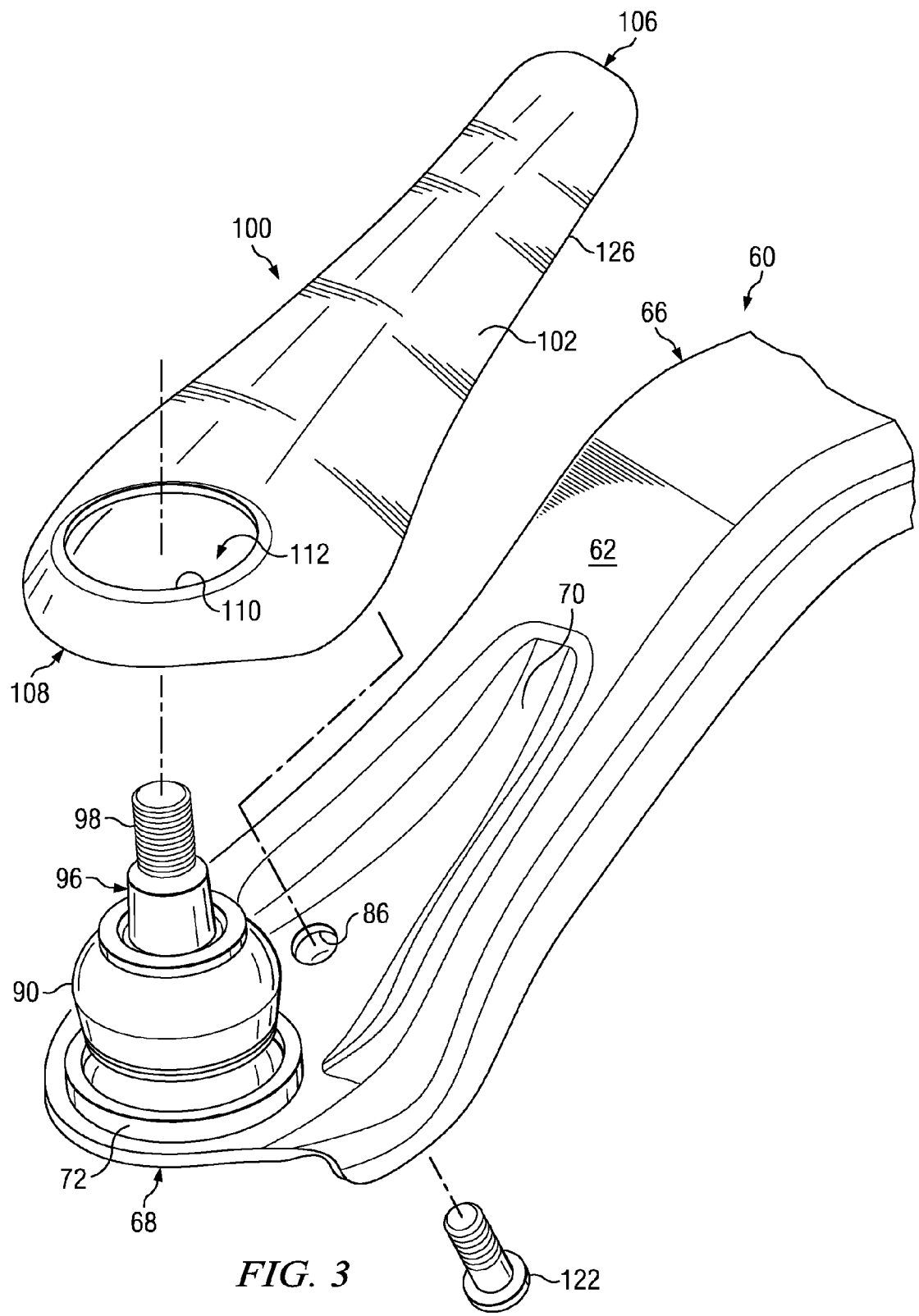
FIG. 3 is a top exploded perspective view depicting a portion of a control arm and an associated ball joint assembly, of a control arm assembly of the suspension system of FIG. 2, and further depicting a protective cap, according to one embodiment, of the control arm assembly.
Figure 4:
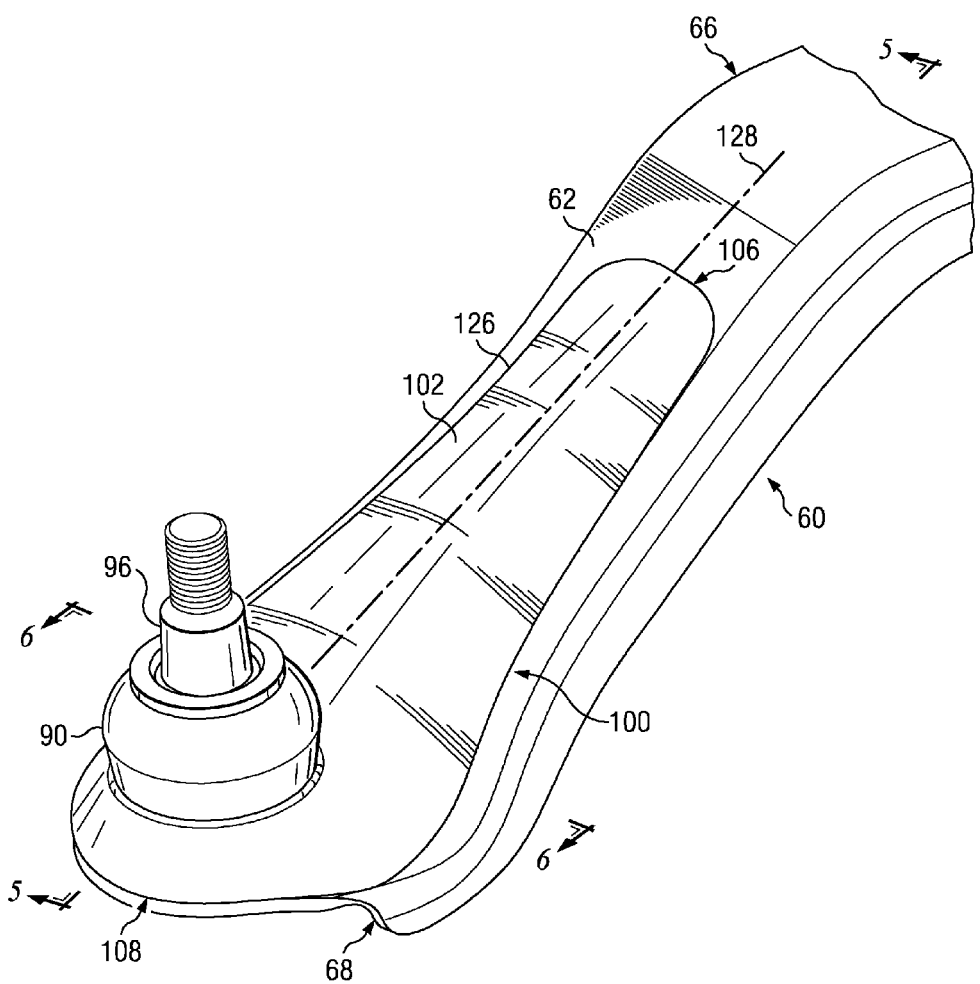
FIG. 4 is a top perspective view depicting the portion of the control arm and the associated ball joint assembly, and the protective cap of the control arm assembly of FIG. 3, with the protective cap attached to the control arm.

Referring to FIGS. 3-7, the control arm 40 can include a knuckle support member 60, which can include an upper surface 62 (FIGS. 3 and 4), a lower surface 64 (FIG. 7), a proximal end portion 66 (FIGS. 3 and 4), and a distal end portion 68 (FIGS. 3 and 4). The upper surface 62 of the knuckle support member 60 can include a recessed portion 70 (FIG. 3), which can extend from the distal end portion 68 toward the proximal end portion 66.

Figure 5:
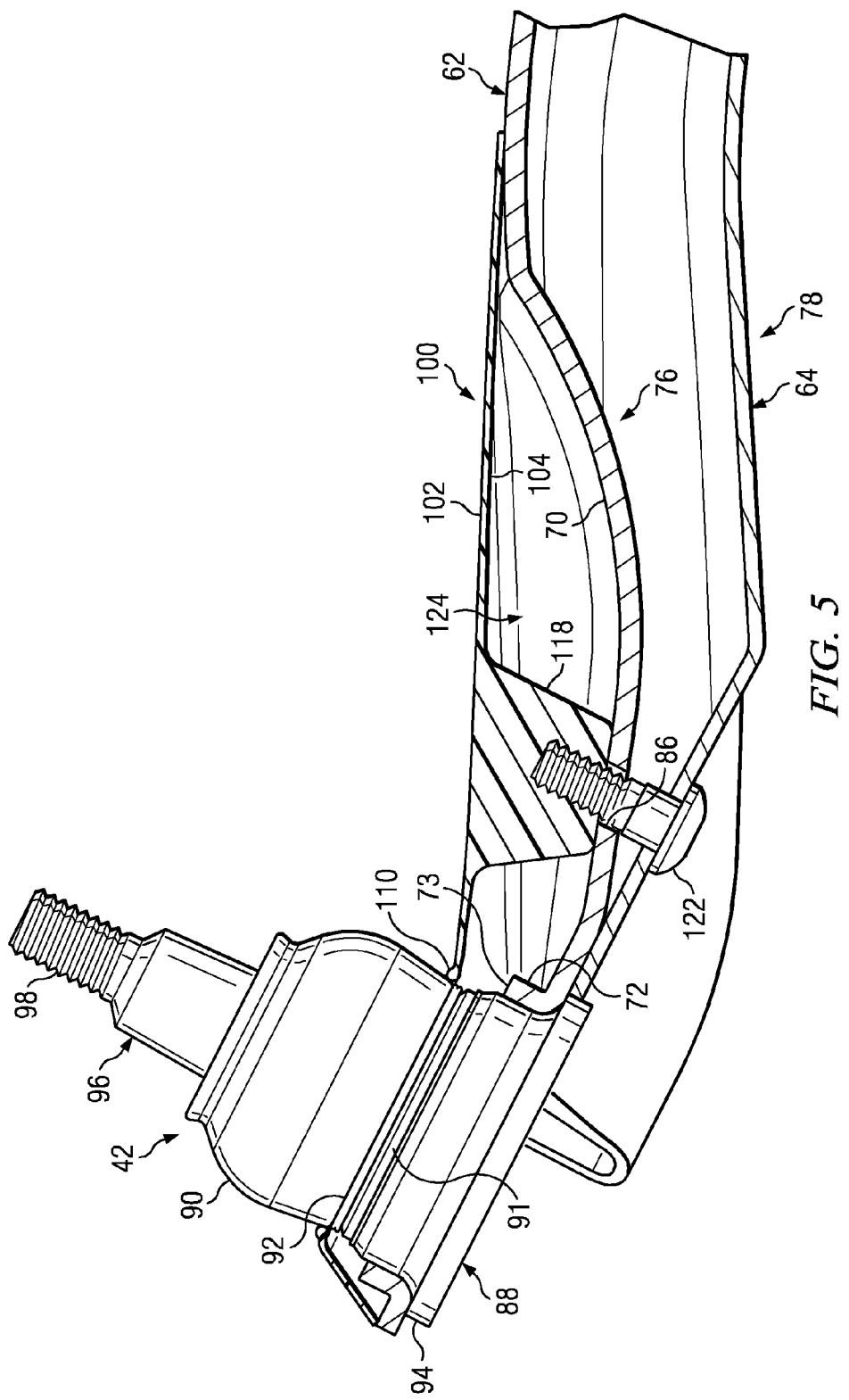
FIG. 5 is a cross-sectional view taken along line 5-5 in FIG. 4.
Figure 6:
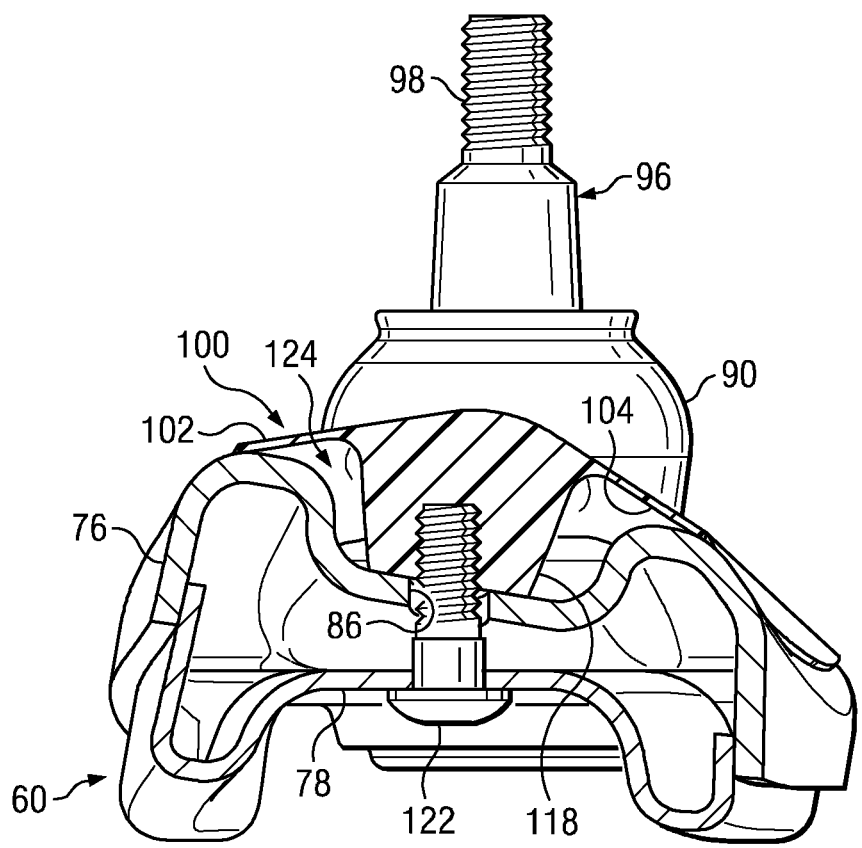
FIG. 6 is a cross-sectional view taken along line 6-6 in FIG. 4.
Figure 7:
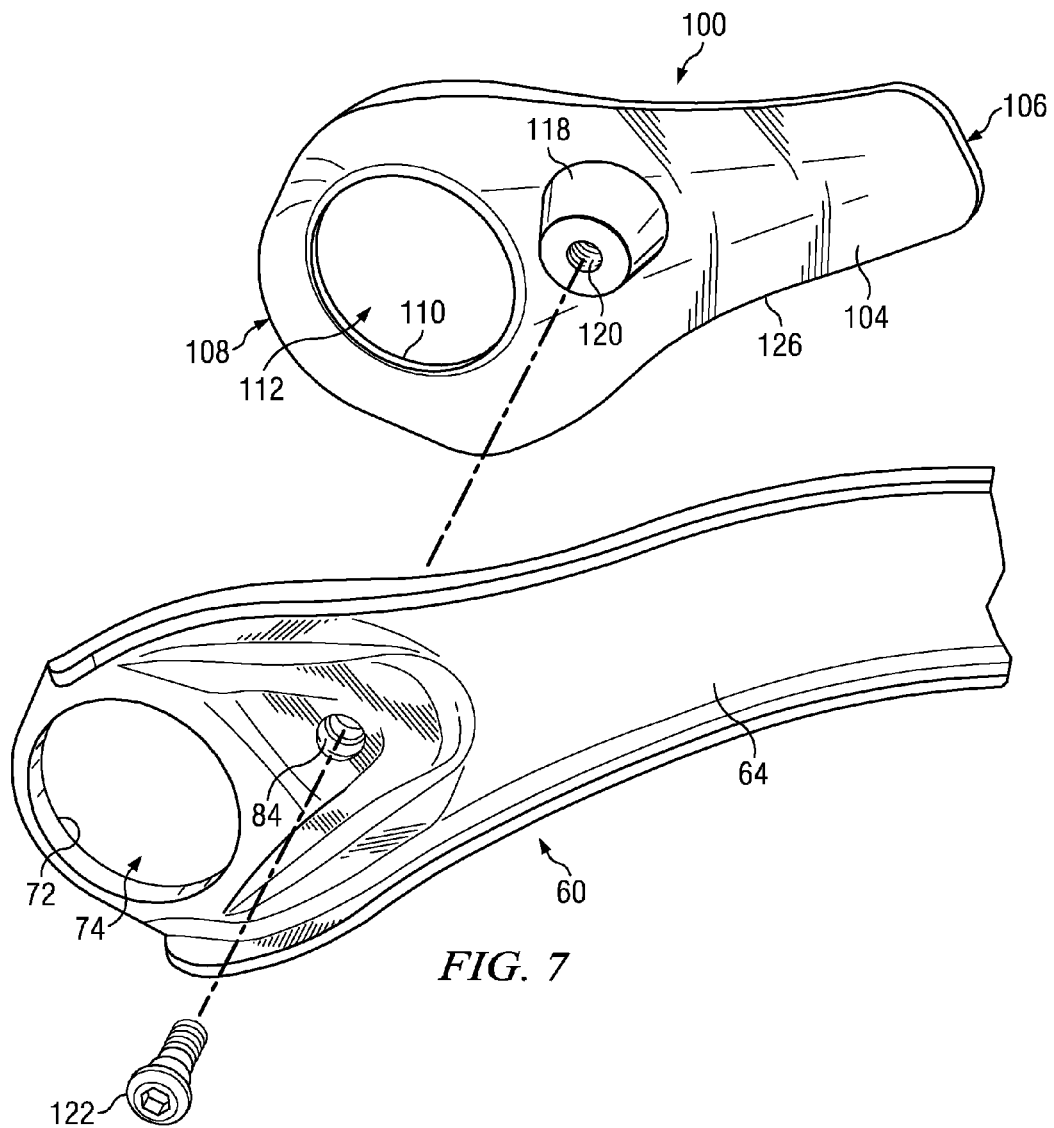
FIG. 7 is a bottom exploded perspective view depicting the portion of the control arm, and the protective cap, of the control arm assembly of FIG. 3, with the ball joint assembly omitted for clarity of illustration.

The distal end portion 68 of the knuckle support member 60 can include a collar 72 (FIGS. 3, 5 and 7), which can include an upper surface 73 (FIG. 5) and can define an aperture 74 (FIG. 7). The collar 72 can extend above the upper surface 62 of the knuckle support member 60 as shown in FIG. 5. In one embodiment, at least a portion of the knuckle support member 60 can be hollow, and can include an upper member 76 and a lower member 78, as shown in FIGS. 5-6. The upper member 76 can be attached to the lower member 78, for example, by welding or fastening the members 76, 78 to one another. In this embodiment, the upper surface 62 of the knuckle support member 60 can be an upper surface of the upper member 76, and the lower surface 64 of the knuckle support member 60 can be a lower surface of the lower member 78, as shown in FIG. 5. The lower member 78 of the knuckle support member 60 can define a fastener-receiving aperture 84 (FIG. 7) and the upper member 76 of the knuckle support member 60 can define a fastener-receiving aperture 86 (FIGS. 3 and 5).

The ball joint assembly 42 (FIGS. 2 and 5) can include a ball joint 88 and a boot 90 that can be attached to the ball joint 88, for example with one or more bands, or clips, such as a circlip 92. The ball joint 88 can include a housing 94 (FIG. 5), or socket base. The ball joint 88 can also include a stem 96, which can include a threaded portion 98. The stem 96 can extend through an aperture (not shown) defined by the wheel knuckle 32, and a female fastener, such as a nut 99, can be attached to the threaded portion 98 of stem 96 as shown in FIG. 2 to attach the ball joint 88 to the wheel knuckle 32, which can pivotally couple the control arm 40 with the wheel knuckle 32. The stem 96 of the ball joint 88 can be engaged with the housing 94 of ball joint 88 in a spheroid-type arrangement such that the stem 96 can move with respect to the housing 94.

The housing 94 of the ball joint 88 can be received within the aperture 74 defined by the collar 72 of the knuckle support member 60 and can engage the collar 72, as shown in FIG. 5.

In one embodiment, the housing 94 can engage the collar 72 in an interference fit, and can be press-fit into the collar 72. The boot 90 can be disposed in surrounding relationship with the housing 94 of ball joint 88, and can contain a lubricant such as grease therein. The boot 90 can include a lower end 91.

The control arm assembly 34 can include a protective cap 100, according to one embodiment. The protective cap 100 can be attached to the knuckle support member 60 and can include an upper surface 102 (FIGS. 3-6), a lower surface 104 (FIGS. 5-7), a proximal end 106 (FIGS. 3, 4 and 7), and a distal end 108 (FIGS. 3, 4 and 7). In one embodiment, the protective cap 100 can be formed from a plastic material as a unitary structure, using any suitable molding process. In other embodiments, the protective cap 100 can be made from any other suitable material, for example a composite material, a metal, or metal alloy. The protective cap 100 can also include an annular rim 110, which can define an opening 112 as shown in FIGS. 3 and 7. The annular rim 110 can be positioned adjacent to the distal end 108 of the protective cap 100.

In one embodiment, the protective cap 100 can be fastened to the knuckle support member 60. As shown in FIGS. 5-7, the protective cap 100 can include a mount boss 118. The mount boss 118 can extend below the lower surface 104 of the protective cap 100 and can define a threaded aperture 120 (FIG. 7). The control arm assembly 34 can include a male fastener, such as a bolt 122 (FIGS. 5-7). Bolt 122 can extend through each of the fastener-receiving apertures 84 and 86 defined by the knuckle support member 60, and can be threaded into the threaded aperture 120 defined by the mount boss 118 of the protective cap 100 to attach the protective cap 100 to the knuckle support member 60. In other embodiments, the protective cap 100 can be attached to the knuckle support member 60 in any other suitable manner. For example, the protective cap 100 can be attached to the knuckle support member 60 using one or more straps, bands, or clips, either in conjunction with one or more fasteners, or in lieu of any fasteners.

As shown in FIG. 5, the protective cap 100 can overlie the recessed portion 70 of the upper surface 62 of the knuckle support member 60. The protective cap 100 and the knuckle support member 60 can cooperate to define a cavity 124 (FIGS. 5 and 6). The recessed portion 70 of the upper surface 62 of the knuckle support member 60 can partially define the cavity 124. As shown in FIG. 5, the collar 72 of the knuckle support member 60 and the mount boss 118 of protective cap 100 can be positioned within the cavity 124.

The boot 90 can be made from a resilient material, for example, natural or synthetic rubber. Boot 90 can extend through the opening 112 defined by the annular rim 110 of the protective cap 100. The annular rim 110 can be disposed in contacting engagement with the boot 90, which can be a sealing engagement with the boot 90. In one embodiment, the annular rim 110 can engage the boot at a location above the lower end 91 of the boot 90, as shown in FIG. 5. The annular rim 110 of the protective cap 100 can be positioned above the upper surface 73 of the collar 72 of the knuckle support member 60, as shown in FIG. 5.

The protective cap 100 can include a perimeter 126 (FIGS. 3, 4 and 7). The protective cap 100 can be in contacting engagement with the upper surface 62 of the knuckle support member 60 along substantially the entire perimeter 126, or the entire perimeter 126, of the protective cap 100. The engagement of the annular rim 110 of the protective cap 100 with the boot 90 can cooperate with the engagement of the housing 94 of the ball joint 88 with the collar 72, and with the contacting engagement of the protective cap 100 with the upper surface 62 of the knuckle support member 60, to at least substantially seal the cavity 124, which can at least substantially prevent water, ice, snow, and debris from entering the cavity 124. In one embodiment, a sealant can be applied to the protective cap 100 and/or the knuckle support member 60 around the entire perimeter 126 of the protective cap 100 to facilitate sealing the cavity 124. In one embodiment a sealant can be applied to the lower surface 104 of the protective cap 100 and/or the upper surface 62 of the knuckle support member 60. In one embodiment, the knuckle support member 60 can include one or more drain holes, for example a first drain hole can be located at a lowest position of the upper member 76 of the knuckle support member 60 and a second drain hole can be located at a lowest position of the lower member 78 of the knuckle support member 60, to facilitate draining any water that may enter the cavity 124.

The protective cap 100 can include a longitudinal centerline axis 128 (FIG. 4). In one embodiment, the protective cap 100 can slope generally downwardly from the proximal end 106 toward the annular rim 110, along the longitudinal centerline axis 128. The upper surface 102 of the protective cap 100 can have a generally convex shape, as the protective cap 100 is viewed in transverse cross-section, at least at a location proximal of, and adjacent to, the annular rim 110 of the protective cap 100, as shown in FIG. 6. This convex shape can facilitate water rolling off of the upper surface 102 of the protective cap 100.

Protective caps such as the protective cap 100 can result in certain advantages. For example, it can be advantageous for reasons of strength and manufacturability to design the knuckle support member 60 of the control arm 40 such that the upper surface 62 of the knuckle support member 60 includes the recessed portion 70 adjacent to the ball joint assembly 42. The protective cap 100 can be attached to the knuckle support member 60 and can overlie the recessed portion 70 of the upper surface 62 of the knuckle support member 60, which can facilitate preventing water or snow from accumulating adjacent to the boot 90 due to the recessed portion 70 of the upper surface 62. This can prevent, or at least substantially prevent, the build-up of ice adjacent to the boot 90. Accordingly, the use of the protective cap 100 can prevent, or at least substantially prevent, icing-related distortion of boot 90 and an associated leakage of grease from within boot 90, which can enhance the service life of the ball joint assembly 42. The upper surface 102 of the protective cap 100 can have a generally convex shape, as the protective cap 100 is viewed in transverse cross-section, at least at a position adjacent to the annular rim 110, which can further inhibit water pooling and ice build-up adjacent to the boot 90. The protective cap 100 can be made of a plastic material, or other lightweight material, which can result in a minimal weight and cost increase to the associated suspension system 30. These advantages of the protective cap 100 can be achieved without re-shaping the control arm 40, at least not significantly, which can permit the protective cap 100 to be used with new control arms, such as control arm 40, and/or as a field retrofit part for attachment to the control arms of existing vehicles.

While various embodiments of a protective cap, a control arm assembly, and a vehicle have been illustrated by the foregoing description and have been described in considerable detail, it is not intended to restrict or in any way limit the scope of the appended claims to such detail. Additional modifications will be readily apparent to those skilled in the art.

What is claimed is:

1. A control arm assembly comprising:
a control arm comprising a knuckle support member, the knuckle support member comprising an upper surface, a lower surface, a proximal end portion and a distal end portion, the upper surface including a recessed portion extending from the distal end portion toward the proximal end portion, the distal end portion comprising a collar defining an aperture;
a ball joint assembly comprising a ball joint and a boot, the ball joint comprising a housing received within the aperture defined by the collar of the distal end portion of the knuckle support member, the boot being attached to the ball joint and disposed in surrounding relationship with the housing of the ball joint; and
a protective cap attached to the knuckle support member, the protective cap comprising an annular rim defining an opening; wherein
the protective cap overlies the recessed portion of the upper surface of the knuckle support member; and
the boot extends through the opening defined by the annular rim of the protective cap, the annular rim being disposed in sealing engagement with the boot.

2. The control arm assembly of claim 1, wherein:
the protective cap and the knuckle support member cooperate to define a cavity, the recessed portion of the upper surface of the knuckle support member partially defining the cavity; and
the collar extends above the upper surface of the knuckle support member and is positioned within the cavity.

3. The control arm assembly of claim 2, wherein:
the annular rim of the protective cap is positioned above the collar of the distal end portion of the knuckle support member of the control arm.

4. The control arm assembly of claim 3, wherein:
the housing of the ball joint engages the collar of the distal end portion of the knuckle support member in an interference fit;
the protective cap comprises a perimeter; and
the protective cap is in contacting engagement with the upper surface of the knuckle support member along the entire perimeter of the protective cap; and
the sealing engagement of the annular rim of the protective cap with the boot cooperates with the engagement of the housing with the collar in an interference fit and with the contacting engagement of the protective cap with the upper surface of the knuckle support member to at least substantially seal the cavity defined by the protective cap and the knuckle support member.

5. The control arm assembly of claim 3, wherein:
the boot comprises a lower end;
the annular rim of the protective cap engages the boot above the lower end of the boot; and
the protective cover is formed from a plastic material as a unitary structure.

6. The control arm assembly of claim 2, wherein:
the protective cap further comprises a mount boss positioned within the cavity defined by the protective cap and the knuckle support member.

7. The control arm assembly of claim 6, further comprising:
a male fastener; wherein
the knuckle support member defines at least one fastener-receiving aperture;
the mount boss of the protective cap defines a threaded aperture; and the male fastener extends through the at least one fastener-receiving aperture defined by the knuckle support member and is threaded into the threaded aperture defined by the mount boss of the protective cap.

8. The control arm assembly of claim 1, wherein:
the boot comprises a lower end; and
the annular rim of the protective cap engages the boot above the lower end of the boot.

9. The control arm assembly of claim 1, wherein:
the protective cap comprises a plastic material.

10. The control arm assembly of claim 1, wherein:
the protective cap comprises an upper surface; and
the upper surface of the protective cap has a generally convex shape, as the protective cap is viewed in transverse cross-section, at least at a location proximal of, and adjacent to, the annular rim of the protective cap.

11. The control arm of claim 1, wherein:
the protective cap comprises a proximal end, a distal end, and a longitudinal centerline axis; and
the annular rim is positioned adjacent to the distal end of the protective cap.

12. The control arm assembly of claim 1, wherein:
the protective cap is formed from a plastic material as a unitary structure; and
the opening defined by the annular rim of the protective cap is aligned with the aperture defined by the collar of the distal end portion of the knuckle support member.

13. A control arm assembly comprising:
a control arm comprising a knuckle support member, the knuckle support member comprising an upper surface, a lower surface, a proximal end portion and a distal end portion, the upper surface including a recessed portion extending from the distal end portion toward the proximal end portion, the distal end portion comprising a collar defining an aperture; and
a protective cap attached to the knuckle support member, the protective cap being formed from a plastic material as a unitary structure, the protective cap comprising an annular rim defining an opening; wherein
the protective cap overlies the recessed portion of the upper surface of the knuckle support member;
the opening defined by the annular rim of the protective cap is aligned with the aperture defined by the collar of the distal end portion of the knuckle support member;
the protective cap comprises a perimeter; and
the protective cap is in contacting engagement with the upper surface of the knuckle support member along the entire perimeter of the protective cap.

14. The control arm assembly of claim 13, further comprising:
a ball joint assembly comprising a ball joint and a boot, the ball joint comprising a housing received within the aperture defined by the collar of the distal end portion of the knuckle support member of the control arm, the boot being attached to the ball joint and disposed in surrounding relationship with the housing; wherein
the boot extends through the opening defined by the annular rim of the protective cap;
the boot comprises an elastomeric material; and
the annular rim of the protective cap is disposed in sealing engagement with the boot.

15. The control arm assembly of claim 14, wherein:
the protective cap comprises a proximal end, a distal end, and a longitudinal centerline axis;
the annular rim is positioned adjacent to the distal end of the protective cap; and
the upper surface of the protective cap has a generally convex shape, as the protective cap is viewed in transverse cross-section, at least at a location proximal of, and adjacent to, the annular rim of the protective cap.

16. A vehicle comprising:
a front wheel;
a knuckle coupled with the front wheel;
a frame; and
a control arm assembly pivotally coupled with the knuckle and with the frame; wherein
the control arm assembly comprises a control arm and a ball joint assembly pivotally coupling the control arm with the knuckle;
the control arm comprises a knuckle support member and the control arm assembly further comprises a protective cap attached to the knuckle support member;
the knuckle support member comprises an upper surface, a lower surface, a proximal end portion and a distal end portion, the upper surface including a recessed portion extending from the distal end portion toward the proximal end portion, the distal end portion comprising a collar defining an aperture;
the ball joint assembly comprises a ball joint and a boot, the ball joint comprising a stem attached to the knuckle, and a housing received within the aperture defined by the collar of the distal end portion of the knuckle support member;
the protective cap overlies the recessed portion of the upper surface of the knuckle support member and comprises an annular rim defining an opening aligned with the aperture defined by the collar of the distal end portion of the knuckle support member; and
the boot extends through the opening defined by the annular rim of the protective cap, the annular rim being disposed in sealing engagement with the boot.

17. The vehicle of claim 16, wherein:
the protective cap is formed from a plastic material as a unitary structure.

18. The vehicle of claim 17, wherein:
the protective cap comprises a proximal end, a distal end, and a longitudinal centerline axis;
the annular rim is positioned adjacent to the distal end of the protective cap;
the protective cap slopes generally downwardly from the proximal end toward the annular rim along the longitudinal centerline axis; and
the upper surface of the protective cap has a generally convex shape, as the protective cap is viewed in transverse cross-section, at least at a location proximal of, and adjacent to, the annular rim of the protective cap.

19. The vehicle of claim 16, wherein:
the protective cap and the knuckle support member cooperate to define a cavity, the recessed portion of the upper surface of the knuckle support member partially defining the cavity.

20. The vehicle of claim 19, wherein:
the boot comprises a lower end;
the annular rim of the protective cap engages the boot above the lower end of the boot;
the collar of the distal end portion of the knuckle support member extends into the cavity;
the housing of the ball joint engages the collar in an interference fit; and
the annular rim of the protective cap is positioned above the collar.

\* \* \* \* \*